Aug. 25, 1936.  F. E. BLOUNT  2,052,273
REMOTE CONTROL CIRCUIT
Filed July 20, 1935
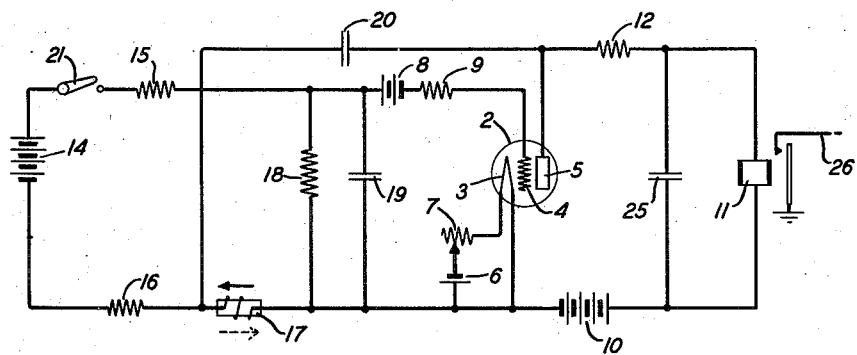
INVENTOR
F. E. BLOUNT
BY
ATTORNEY Patented Aug. 25, 1936

2,052,273

UNITED STATES PATENT OFFICE 2,052,273

REMOTE CONTROL CIRCUIT

Frank E. Blount, Verona, N. J., assignor to Bell Telephone Laboratories, Incorporated, New York, N. Y., a corporation of New York Application July 20, 1935, Serial No. 32,324

2 Claims. (Cl. 250—27)

This invention relates to remote control circuits and more particularly to improved means for controlling the release of the arc discharge in a gas-filled tube of the grid controlled type.

In the operation and control of gas-filled tubes it is a well-known phenomenon that, as long as the control electrode or grid is maintained at a potential negative with respect to the cathode or filament, no plate current will flow, but that once the grid potential is made positive, current will flow in the plate circuit and will continue to flow after the starting voltage has been removed. In other words, once ionization of the gas contained in the tube takes place, the grid loses control of the tube and before control may be restored to the grid it is necessary to effect a deionization of the gas, or a quenching of the arc in which the ionization of the gas manifests itself.

Arrangements proposed in the past for resetting or restoring gas-filled tubes to an unoperated condition have involved the use of electromagnetically manually operated switching devices to open the anode or plate circuit; means for applying an alternating voltage to the plate circuit by way of a rectifier and other arrangements involving a reversal of the plate potential.

It is the object of this invention to provide an improved method of resetting gas-filled tubes.

This object is attained in accordance with a feature of the invention by automatically causing the application of a high negative voltage to the plate electrode of a gas-filled tube upon the interruption of the grid control circuit. More specifically, this invention contemplates the incorporation of means in the grid control circuit of a gas-filled tube which, upon the interruption of the control circuit, is traversed by the decaying grid control current so as to have generated therein a potential which is applied to the plate electrode by way of a condenser, the potential being such as to override the normal positive plate potential and cause the ionization of the gas contained in the tube to be interrupted.

The invention will be readily understood from the following detailed description made with reference to the accompanying drawing which discloses a remote control switching system involving the features of this invention.

In the drawing, the gas-filled tube 2 comprises a tube containing a small amount of gas such as neon, argon and the like, a cathode or filament 3, a control electrode or grid 4 and an anode or plate electrode 5. The filament is supplied with heating current from battery 6 by way of the variable resistance 7. The grid 4 is normally biased negatively by the battery 8 connected thereto by way of the grid leak 9. The tube output or plate circuit includes the plate battery 10, winding of relay 11, resistance 12 and the plate electrode 5.

The grid control circuit includes the battery 14, line loop generally indicated by the resistances 15 and 16, inductance 17, resistance 18, condenser 19, and the grid battery 8 and the grid leak 9.

A condenser 20 has one plate thereof connected to the plate electrode 5 of the tube 2 and the other plate connected to one of the line conductors at a point intermediate the inductance 17 and the negative pole of battery 14.

The system operates in the following manner: When it is desired to effect the actuation of relay 11 at a point remote from a control station at which the key 21 is located, the key is actuated to its closed position, thereby connecting the positive plate of battery 14 to the grid control circuit.

When key 21 is closed, direct current will flow from the positive pole of battery 14, through key 21, line resistance 15, resistance 18, inductance 17, line resistance 16 to the negative pole of battery 14. A voltage is accordingly built up across the terminals of the resistance element 18 which charges the condenser 19. The condenser 19 introduces a time lag between the closure of the key 21 and the arcing of the tube 2.

The positively charged plate of condenser 19 is connected to the grid 4 of the tube 2 through resistance 9 and the grid biasing battery 8 while the negatively charged plate of condenser 19 is connected to the cathode. With key 21 closed, the voltage across the condenser 19 will override the voltage from the biasing battery 8 and permit an arc to strike in the tube 2.

With the ionization of the gas contained in the tube 2, the anode circuit is completed so that the plate current traverses a path which may be traced from the positive pole of plate battery 10, winding of relay 11, current limiting resistance 12, plate 5, filament 3 to the negative pole of battery 10.

Relay 11 operates in the plate circuit and closes the work circuit 26.

When key 21 was closed and the grid control circuit completed, as hereinbefore described, the inductance 17 served as an energy storage device so that when the key is open, this energy is released causing a decaying current to traverse the inductance 17 in a direction indicated by the broken arrow which is reverse to that traveled by the grid control current when the key 21 was closed, as indicated by the solid arrow. A potential is accordingly built up across the terminals of the inductance 17 in such a direction as to cause the plate of condenser 20 connected to the plate 5 to become highly charged negatively. This high negative charge is applied to the plate 5 and is of such a value as to override the normal positive plate potential derived from the plate battery 10. The condenser 25 absorbs the conductive energy of relay 11 at this time and prevents the voltage at anode 5 from building up to a high value as the current flowing is reduced due to the application of the opposing electromotive force through condenser 20. The plate accordingly becomes negatively charged and the arc quenched.

What is claimed is:

1. In combination, a normally unoperated gas-filled discharge device having cathode, grid and plate electrodes, a grid control circuit including a source of potential, means for closing said grid control circuit to said grid electrode to cause the discharge of said device, and means effective upon the reoperation of said first means to open said grid control circuit for restoring said device to normal, said means including an inductance in said grid control circuit and a condenser serially connecting said inductance and said plate electrode.

2. In combination, a normally unoperated gas-filled discharge device having cathode, grid and plate electrodes, said plate electrode having a positive potential normally applied thereto, a grid control circuit including a source of potential, means for closing said grid control circuit to said grid electrode to cause the discharge of said device, and means effective upon the reoperation of said first means to open said grid control circuit for effecting a reversal of the potential normally applied to said plate electrode, said means including an energy storing device in said grid control circuit and a condenser serially connecting said energy storing device and said plate electrode.

FRANK E. BLOUNT.